Figure 1:
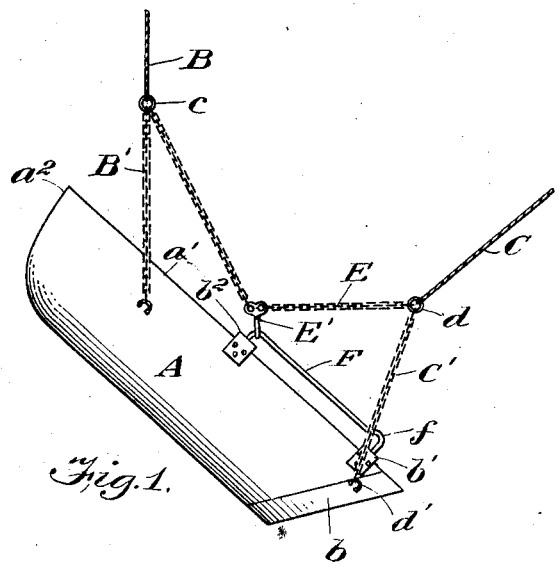

C. A. MORRIS.
EXCAVATING SHOVEL.
APPLICATION FILED AUG. 5, 1910.

1,002,733.

Patented Sept. 5, 1911.

2 SHEETS—SHEET 1.

WITNESSES
Robert Head
J. F. Mothershead

INVENTOR:
Charles A. Morris
BY
Griffin Burkhard
ATTORNEYS

C. A. MORRIS.
EXCAVATING SHOVEL.
APPLICATION FILED AUG. 5, 1910.

1,002,733.

Patented Sept. 5, 1911.

2 SHEETS—SHEET 2.

WITNESSES
Robert Head
J. F. Mothershead

INVENTOR
Charles A. Morris
BY
Griffins Bernhard
ATTORNEYS

UNITED STATES PATENT OFFICE.

CHARLES A. MORRIS, OF MONTCLAIR, NEW JERSEY.

EXCAVATING-SHOVEL.

1,002,733. Specification of Letters Patent. Patented Sept. 5, 1911.

Application filed August 5, 1910. Serial No. 575,748.

*To all whom it may concern:*

Be it known that I, CHARLES A. MORRIS, a citizen of the United States, residing in Montclair, county of Essex, and State of New Jersey, have invented a certain new and useful Excavating-Shovel, of which the following is a specification.

This invention is an excavating shovel, the same being intended, more particularly, for use in conjunction with a trolley or carrier adapted to travel upon an overhead track, and to be operated by power positioned at a point distant from the shovel.

The shovel is operated to be loaded at one end and to be unloaded at the end which receives the load. After loading, the shovel is raised to a suspended position at a desired height above the ground, it is carried while in such suspended position to a spoil bank, or other place of discharge, and the load is discharged by moving the suspended shovel into a tilting dumping position.

Two cables or lines are employed for operating the shovel, one cable being a fall rope adapted to raise and lower the shovel, and the other cable operating to haul the shovel when loading it and to impart movement to said shovel and to the carrier or trolley for conveying the load to the spoil bank, or other place of discharge.

A special feature of the new shovel mechanism consists of means controlled by the haul rope or cable for precluding dumping of the shovel when loaded and suspended, and during the operation of conveying the loaded shovel to the place of discharge. The fall rope is connected by a bail, shackle, or other device at a point rearwardly of the direction of the center of gravity of the shovel. The haul rope is attached by a bail, shackle or other device to the shovel, at the open front end thereof, the shovel being closed at its rear end. Intermediate the fall rope and the haul rope is a shovel controlling member, preferably in the form of a flexible rope or chain, said member having a sliding connection with the front part of the shovel, whereby tension on the haul rope tends to keep the front part of the shovel in a raised position when the loaded shovel is suspended and conveyed, but when the strain is relaxed on said haul rope, the slidable connection moves upon the shovel rearwardly toward the point of suspension, whereupon the shovel is turned or tilted into a downwardly inclined position for the purpose of discharging the load through that end of the shovel which received the load.

Various other features of the invention, and the advantages thereof, will be set forth in the detailed description hereinafter set forth.

In the accompanying drawings I have illustrated different practical embodiments of the invention, but it will be understood that they are illustrative only, and do not define or limit the invention.

Figure 3:
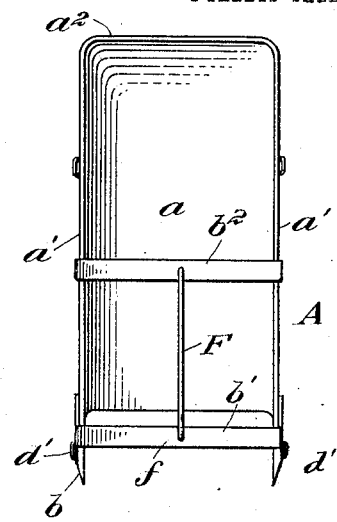
Figure 2:
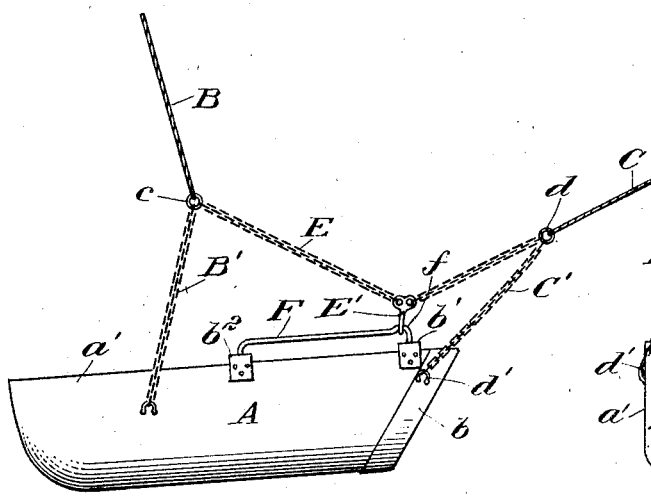
Figure 4:
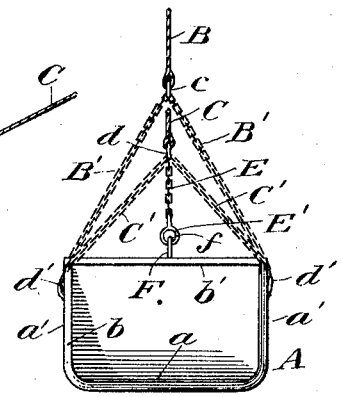
Figure 5:
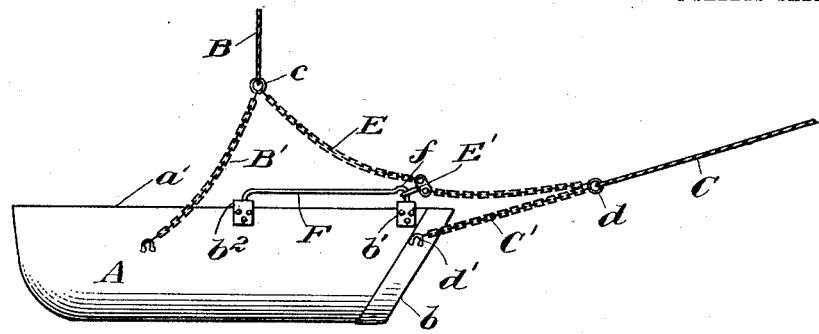
Figures 6, 7:
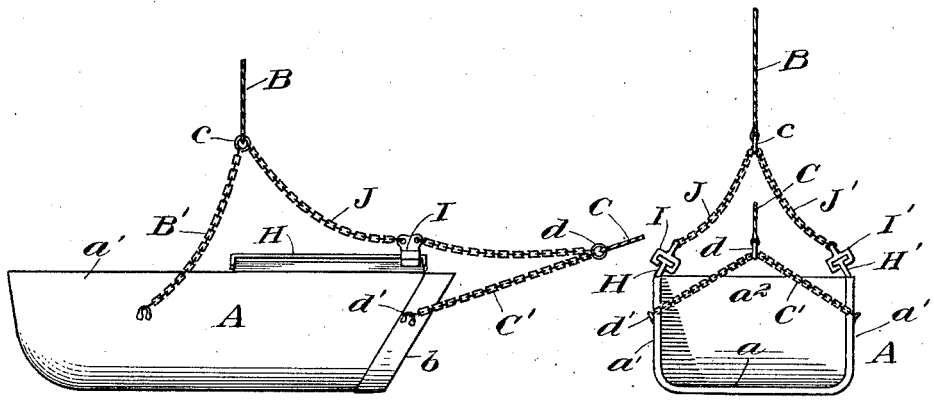

Figure 1 is a side elevation of my excavating shovel, illustrating one of the positions which it may assume when lowering the shovel into a loading position, or when said shovel is being hauled when its front edge is in contact with the ground for scraping and loading operations. Fig. 2 is a side elevation with the bucket and load suspended from the trolley or carrier for the purpose of conveying the load to a point of discharge. Fig. 3 is a plan view of the bucket or shovel, the fall rope and the haul rope being omitted. Fig. 4 is a front elevation looking at the open end of the shovel and illustrating the relation of the fall rope, the haul rope, and the flexible shovel-controlling member intermediate the fall and haul ropes. Fig. 5 is a side elevation of the shovel shown in Figs. 1 to 4, both inclusive, illustrating the positions of the parts during the operations of scraping the ground and loading the shovel. Figs. 6 and 7 are views in side elevation and end elevation, respectively, illustrating another embodiment of the invention.

A designates a shovel which, in some respects, is similar in construction to ordinary shovels employed for excavating and conveying purposes. As shown, the shovel comprises a bottom, $a$, two side walls, $a'$, and an end wall, $a^2$, all being composed, preferably, of metal in one or more pieces. The shovel is open at its front end, and the side walls, $a'$, at said open front end are inclined backwardly and downwardly, as shown. It is preferred, also, to employ a reinforcing strap or band, $b$, around the mouth portion at the open front end of the shovel, and this band or strap produces at the front end of the shovel shown in Figs. 1 to 5 inclusive a cross bar, $b'$, which spans the open top side of said shovel, the purpose of which cross bar will hereinafter appear.

To the shovel are connected two ropes, cables, or their equivalents, one of which is a fall rope B and the other a haul rope, C. The connection of the fall rope, B, to the shovel is secured by the employment of a bail or shackle, B', the upper part of which bail or shackle is provided with a ring or eye, $c$, fastened to the lower end of the fall rope. Said shackle or bail, B', is attached at its ends to the respective side walls of the shovel, and such attachment is at a point rearwardly of the direction of the center of gravity through the shovel. The haul rope, C, is connected with the open front part of the shovel by a bail or shackle, C'. Said shackle or bail is shown as consisting of chains provided at the middle with a ring or eye, $d$, the rear ends of the chains being attached, as at $d'$, to the respective side walls of the shovel, or to the band or strap, $b$, thereof. The haul rope is attached to the eye or ring, $d$, of the shackle, so that when loading the shovel the strain of the haul rope is transmitted to the shovel through the shackle or bail, C', but this shackle is adapted to become slack when the shovel is loaded and suspended for conveying purposes, at which time the strain is transmitted from the haul rope to the shovel through means operating to retain the shovel in a non-dumping position at times when the shovel is suspended and conveyed.

E designates a shovel controlling member positioned intermediate the fall rope and the haul rope and having a slidable connection with the front part of the shovel. Said controlling member is a chain or cable positioned substantially above the shovel, one end of said chain or cable being secured to the ring, $c$, of the fall rope, whereas the other end of the member is attached to the ring or eye, $d$, of the haul rope. At a point intermediate its attachment to rings, $c$, $d$, the controlling rope or chain is provided with a slide, ring or eye, E', which coöperates with a rod or bar F so as to have slidable engagement therewith. The rod or bar, F, in the construction shown in Figs. 1 to 5 inclusive, is a substantially straight element positioned centrally over the shovel, at the forward part thereof, one end of said rod or bar being secured fixedly to the cross bar, $b'$, and having its other rear end secured to another cross bar, $b^2$, the latter being fastened to the side walls, $a'$, of the shovel rearwardly of the cross bar, $b'$. The rod or bar, F, and ring or eye, E', constitute the slidable connection between the shovel and the flexible controlling member E, whereby the shovel when loaded and suspended will be retained in a non-dumping position during the operation of conveying the loaded shovel to a place of discharge. The rod or bar, F, is shown as being provided with an offset, $f$, which forms a notch at or near the front end of said rod or bar, and when the shovel is raised and suspended to a non-dumping position the slide or ring E' fits in this notch so as to be retained temporarily from sliding on the rod or bar, lengthwise thereof.

The operation of the shovel is as follows:—Assuming that the shovel is suspended over the place where the work of excavating is to be performed, the fall rope and the haul rope are slackened, so that the shovel will assume the position shown in Fig. 1 and be lowered into engagement with the ground, the shovel being drawn forward by tension on haul rope, C, so as to scrape the ground and load the excised material into the shovel; or all the ropes may be slackened to such an extent as to allow the shovel to drop into the position of Fig. 5 and to rest upon the ground in a substantially horizontal position. The haul rope is operated to drag the shovel along and in contact with the ground, the pull or strain of the haul rope being transmitted to the shovel by the bail or shackle C', and the fall rope, shackle B' and flexible controlling member E being in a slackened condition. As the shovel is drawn forwardly by the haul rope, the edges at the open front end of the shovel cut into the ground, and the material thus cut is loaded into the shovel by the forward movement thereof. The ring or slide E' may occupy various positions upon the rod or bar F during the operations of cutting and loading just described owing to the fact that the controlling member E is slackened, but it is preferred to make the controlling member E of such length that the ring or slide E' will occupy the notch of rod or bar F so that when the shovel is to be elevated the ring or slide E' will be in a proper position to retain the shovel in a substantially horizontal non-dumping position, as shown in Fig. 2. The shovel having been loaded, the fall rope, B, is now operated to raise the shovel above the ground, and at this time it is essential that the haul rope, C, be kept under tension in order that the ring or slide may be prevented from moving along the rod or bar F. The strain of the haul rope on the bail or shackle, C', is slackened, and the pull of the haul rope is transmitted through the flexible controlling member E and ring or slide, E', to the shovel and to the ring or eye, $c$, to which the fall rope is connected. The drums of the fall rope and the haul rope are now rotated in unison so that the haul rope C will exert a pull on the shovel for the purpose of retaining said shovel in a non-dumping position while suspended and, also, to impart movement to the suspended shovel and to the trolley or carrier, whereby the loaded shovel will be conveyed to the place where the material is to be discharged by the operation of the haul rope. Upon reaching the place of discharge, the operator slackens upon the haul rope, C, which in turns relaxes the controlling member, E, whereupon ring or slide, E', is permitted to move along the rod or bar F toward the rear thereof, as shown in Fig. 1, whereby the open front end of the shovel is permitted to drop to an inclined position and the load is discharged automatically therefrom. The fall rope may now be operated to move the shovel and the trolley or carrier back to the field of operations, the shovel lowered into engagement with the ground, and the operations repeated.

The invention is not to be understood as being limited to the particular form of slidable connection between the shovel and the flexible controlling member between the fall and haul ropes, for the reason that in Figs. 6 and 7 there is shown another embodiment of the generic features of the invention. As shown, two guide bars H, H', are provided on the side walls, a', a', of the shovel at the front portion thereof, said guide bars being parallel to each other and inclined somewhat to the vertical planes of the side walls. Each guide bar is, preferably, substantially T-shaped in cross section, and with said guide bars are engaged slides I, I', each slide being constructed as shown in Fig. 7 to embrace the head of the T-shaped bar for the purpose of retaining the slide in engagement with the bar and permitting the slide to move freely lengthwise of said bar. Two flexible controlling members, J, J', are employed, one for each slide and its companion guide bar, the front ends of said controlling members converging to the ring or eye d of the shackle, C', to which haul cable, C, is attached. The rear portions of controlling members, J, J' converge and are attached to ring or eye, c, of the fall rope, B, and from this ring or eye depends bail or shackle, B', connecting the rope B to shovel A.

The operation of the shovel mechanism shown in Figs. 6 and 7 is substantially the same as the shovel mechanism of Figs. 1 to 5, both inclusive, for the reason that the pull of the haul rope, C, on the controlling members, J, J' and slides I, I', operates to retain the loaded shovel in a non-dumping position during the operations of elevating and conveying said shovel.

Having thus fully described the invention, what I claim as new and desire to secure by Letters Patent is:—

1. An excavating shovel provided with means for attaching a fall rope thereto at a point rearwardly of its center of gravity, means for attaching a haul rope to a front part of the shovel, a rigid track secured to the shovel at the upper portion thereof, a controlling member attached to the haul rope and the fall rope, and a traveler attached to the controlling member intermediate its ends, said traveler being slidable relative to said rigid track.

2. An excavating shovel having a suspending member for the attachment of a fall rope, a hauling member for the attachment of a haul rope, a controlling member operatively connected to the suspending member and the hauling member, a rigid track attached to the shovel and positioned thereon above line of penetration into the material to be excavated, and a slide attached to the controlling member intermediate its ends, said slide coöperating with, and movable freely upon, said rigid track.

3. An excavating shovel, a fall rope, means for connecting the fall rope to said shovel rearwardly of the center of gravity, a haul rope, means for connecting said haul rope to a front part of the shovel, a rigid track extending lengthwise of the shovel, said track being positioned above the top edges of the shovel, a controlling member attached to the fall rope and the haul rope, and a slide attached to the controlling member intermediate its ends, said slide coöperating with the track and adapted, by maintaining tension on the haul rope, to retain the shovel in a non-dumping position.

4. An excavating shovel, a fall rope bridle attached to the shovel rearwardly of its center of gravity, a haul rope bridle attached to the shovel at a front part thereof, a rigid track attached to the shovel substantially above the line at which the shovel is adapted to penetrate into the material to be loaded into the same, a controlling member attached at its respective ends to said bridles, and a slide carried by said controlling member intermediate the ends thereof, said slide coöperating with the rigid track and adapted, by maintaining tension on the haul rope, to retain a loaded shovel in a non-dumping position.

5. An excavating shovel open at one end and closed at the other end, a guide bar on said shovel, means for connecting a fall rope to the shovel rearwardly of the center of gravity thereof, means for attaching a haul rope to the front part of the shovel, a shovel-controlling member attached at its respective ends to the fall rope connecting means and the haul rope attaching means, and a slide fitted on said guide bar for movement relative to the shovel, said slide being attached to the controlling member intermediate the ends thereof.

6. An excavating shovel, a guide member thereon, a shovel controlling member adapted to be connected to a haul rope and a fall rope, a slide coöperating with the guide member and the shovel controlling member, and means forming a part of said guide member for restraining the slide from movement upon said guide member when said slide is in a predetermined position thereon.

7. An excavating shovel, a fall rope, means for connecting the fall rope to said shovel rearwardly of the center of gravity, a haul rope, means for connecting said haul rope to the shovel, a single track extending lengthwise of the shovel and positioned intermediate the sides of said shovel, a controlling member attached to the fall rope and the haul rope, and a slide attached to the controlling member intermediate its ends, said slide being reciprocatable on the track and adapted, by maintaining tension on the haul rope, to retain the shovel in a non-dumping position.

In testimony whereof, I have signed this specification in the presence of two subscribing witnesses.

CHARLES A. MORRIS.

Witnesses:
H. I. BEMBERD,
J. F. MOTHERSHEAD.

---

Copies of this patent may be obtained for five cents each, by addressing the "Commissioner of Patents, Washington, D. C."